(12) United States Patent
Terada et al.

(10) Patent No.: US 11,143,563 B2
(45) Date of Patent: Oct. 12, 2021

(54) PRESSURE DETECTION DEVICE WITH NOISE RESISTANT PRESSURE SENSOR

(71) Applicant: HITACHI AUTOMOTIVE SYSTEMS, LTD., Ibaraki (JP)

(72) Inventors: Daisuke Terada, Hitachinaka (JP); Hiroshi Onuki, Hitachinaka (JP); Takuya Aoyagi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 170 days.

(21) Appl. No.: 16/487,331

(22) PCT Filed: Jan. 30, 2018

(86) PCT No.: PCT/JP2018/002842
§ 371 (c)(1),
(2) Date: Aug. 20, 2019

(87) PCT Pub. No.: WO2018/155094
PCT Pub. Date: Aug. 30, 2018

(65) Prior Publication Data
US 2019/0368957 A1 Dec. 5, 2019

(30) Foreign Application Priority Data
Feb. 24, 2017 (JP) .............................. JP2017-032964

(51) Int. Cl.
*G01L 19/00* (2006.01)
*G01L 19/14* (2006.01)
*G01L 19/06* (2006.01)

(52) U.S. Cl.
CPC ........ *G01L 19/0061* (2013.01); *G01L 19/069* (2013.01); *G01L 19/148* (2013.01); *G01L 19/141* (2013.01)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS 8,610,237 B2 12/2013 Sakura
9,470,598 B2 10/2016 Sato et al.
(Continued)

FOREIGN PATENT DOCUMENTS

JP      10-084081 A     3/1998
JP    2005-257442 A     9/2005
(Continued)

OTHER PUBLICATIONS

Japanese Office Action dated Aug. 11, 2020 for Japanese Patent Application No. 2019-501164.
(Continued)

*Primary Examiner* — Andre J Allen
(74) *Attorney, Agent, or Firm* — Volpe Koenig

(57) ABSTRACT

A noise resistance of a pressure sensor is improved while avoiding a hetero metal bonding. A pressure detection device includes a metal case having the diaphragm which is deformed due to a pressure received from a pressure medium, a sensor element which detects a pressure by detecting the deformation of the diaphragm, a lead frame which is electrically connected to the sensor element, and a connection member which holds the lead frame. A first surface of the lead frame, that is, the surface on a side near the metal case in the parallel plate region, and a second surface of the metal case, that is, the upper surface of the base member interpose at least one of the resin of the connection member being an insulator and the insulating adhesive and are disposed to face each other with a predetermined gap therebetween.

11 Claims, 5 Drawing Sheets

(58) Field of Classification Search
CPC ... G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16

USPC .................................................. 73/700–756

See application file for complete search history.

(56) References Cited

U.S. PATENT DOCUMENTS

| 2005/0199068 A1 | 9/2005 | Yoshino |
| 2015/0128715 A1 | 5/2015 | Kamimura et al. |

FOREIGN PATENT DOCUMENTS

| JP | 2013-058650 A | 3/2013 |
| JP | 2013-228268 A | 11/2013 |
| JP | 2013-250148 A | 12/2013 |
| JP | 2014-232025 A | 12/2014 |
| JP | 2016-149435 A | 8/2016 |

OTHER PUBLICATIONS

International Search Report dated Jun. 5, 2018 for the PCT International Application No. PCT/JP2018/002842.

DRAWING VIEWED FROM A (a)

$Cic < Ct$ (b)

(a) BEFORE IMPROVEMENT (b) AFTER IMPROVEMENT

PRESSURE DETECTION DEVICE WITH NOISE RESISTANT PRESSURE SENSOR

TECHNICAL FIELD

The present invention relates to a pressure detection device.

BACKGROUND ART

To achieve environmental friendliness of a vehicle and to improve fuel consumption, a hydraulic system for generating oil pressure by an electric motor, a fuel injection system for injecting fuel by applying pressure to the fuel, and other systems are increasingly adopted. These systems include pressure sensors to detect pressure. In general, a pressure sensor is stored in a metal case to ensure strength reliability, and is attached, by screws, to a metal pipe through which a pressure medium as a measurement target, such as a working fluid, and a liquid fuel. The metal pipe is fixed to a structure at a body GND potential such as the body or the engine of the vehicle. Therefore, the potential of the metal case of the pressure sensor becomes the body GND potential similarly to the metal pipe.

The pressure sensor is connected to an electronic control unit (ECU) mounted in the vehicle through a harness. If unnecessary electromagnetic waves exist around the harness, the harness serves as an antenna to easily pick up the electromagnetic waves. Then, the electromagnetic waves flow into the pressure sensor as noises through the harness. A detection element to detect the pressure in the pressure sensor is disposed facing the metal case with an insulating layer interposed therebetween. This configuration corresponds to that a parasitic capacitance having a relatively large capacitance is electrically connected between the detection element and the GND potential. Since the noises flowing from the harness into the pressure sensor are alternate, the noises more easily flow from the pressure sensor to the metal case as the parasitic capacitance is increased. At this time, if the noises flow into a processing circuit on its way, the processing circuit may cause a malfunction.

A technique of PTL 1 is known to solve the problem. In the technique disclosed in PTL 1, a chip capacitor is provided in a pressure sensor, and one electrode of the chip capacitor is electrically connected to a housing, so that the noises input to the pressure sensor are output to the housing 10 and a measured object through the chip capacitor so as to secure the resistance of the pressure sensor against the noises.

CITATION LIST

Patent Literature

PTL 1: JP 2005-257442 A

SUMMARY OF INVENTION

Technical Problem

In the technique disclosed in PTL 1, a substrate and the housing are bonded by a conductive adhesive, the chip capacitor mounted on a wiring pattern of the substrate and the housing are electrically connected. Therefore, a hetero metal bonding is generated between the wiring pattern or the housing and the conductive adhesive. If the hetero metal bonding occurs, a potential difference is generated between the bonded metals due to a difference in the ionization tendencies of the metals. Therefore, if a closed circuit is formed due to, for example, moisture, corrosion may be caused by galvanization.

Solution to Problem

A pressure detection device according to the present invention comprises a metal case which includes a deformation portion which is deformed by a pressure received from a pressure medium, a detection element which detects the pressure by detecting deformation of the deformation portion, a lead frame which is electrically connected to the detection element, and a structure which holds the lead frame. A first surface of the lead frame and a second surface of the metal case are disposed facing each other with a predetermined gap while interposing an insulator therebetween.

Advantageous Effects of Invention

According to the present invention, it is possible to improve noise resistance of a pressure sensor while avoiding a hetero metal bonding.

DESCRIPTION OF EMBODIMENTS

Hereinafter, embodiments of the invention will be described.

Figure 1:
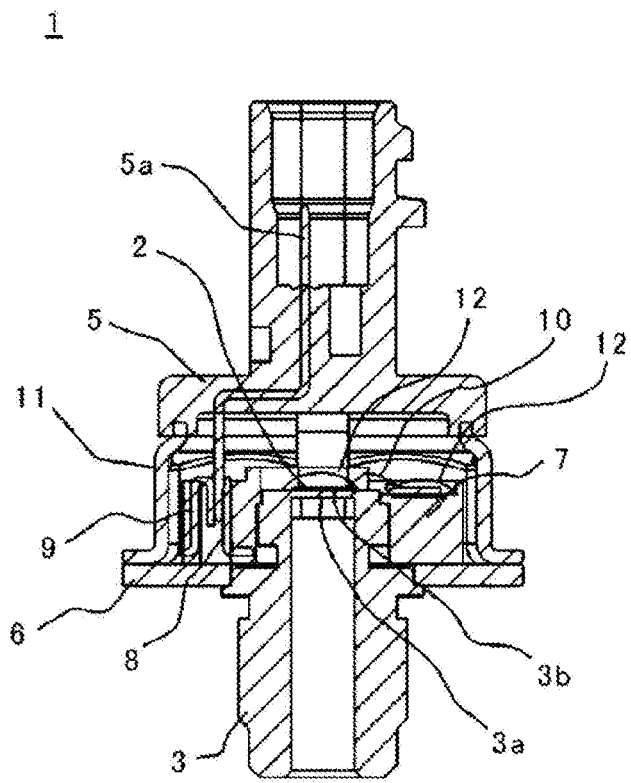
FIG. 1 is a vertical cross-sectional view illustrating a configuration of a pressure detection device according to an embodiment of the invention.

FIG. 1 is a vertical cross-sectional view illustrating a configuration of a pressure detection device 1 according to an embodiment of the invention. The pressure detection device 1 is mounted in a vehicle, and includes a sensor element 2, a pressure port 3, a connector subassembly 5, a base member 6, a connection member 7, a lead frame 8, and a pressing terminal 9.

In the upper portion of the pressure port 3, there is provided a rectangular diaphragm 3a which operates as a pressure-receiving surface of a pressure medium to be measured. The upper surface of the diaphragm 3a, that is, a surface opposite to the pressure-receiving surface, serves as a pedestal surface 3b where the sensor element 2 is placed. The pressure port 3 guides the pressure medium such as a working fluid and a liquid fuel to the pressure-receiving surface of the diaphragm 3a. With this configuration, the diaphragm 3a is deformed according to the pressure of the pressure medium, and a distortion occurs. The sensor element 2 measures a change in resistance according to the deformation of the diaphragm 3a, so as to detect the amount of change, that is, distortion of the diaphragm 3a, and detects the pressure of the pressure medium.

The pressure port 3 and the base member 6 are both made of metal such as SUS, and connected to each other through welding. On the base member 6, the connection member 7 is fixed by an adhesive or the like. In the following, the combined body of the pressure port 3 and the base member 6 will be called "metal case". Further, the pressure port 3 and the base member 6 may be integrally formed as the metal case, instead of bonding the pressure port 3 and the base member 6 to form the metal case.

The connector subassembly 5 includes a connector terminal 5a. A harness, not illustrated, is connected to the connector terminal 5a. The pressure detection device 1 is connected to an ECU of the vehicle through the harness, so as to output a pressure detection result to the ECU. In the connector subassembly 5, a cover 11 is integrally formed to protect the sensor element 2 from the outside. Further, the cover 11 is formed in, for example, a hexagonal shape.

The connection member 7 is a structure for supporting the lead frame 8. In the connection member 7, there is formed an inserting portion to insert the connector terminal 5a. In the inserting portion, one end of the lead frame 8 and the pressing terminal 9 are disposed. On the other end side of the lead frame 8, a bonding portion is provided to be connected to the sensor element 2 by wire bonding using a wire 10. The wire 10 may be formed of aluminum (Al) or gold (Au). The sensor element 2 and the ECU are electrically connected through the wire 10, the lead frame 8, the connector terminal 5a, and the harness by inserting the connector terminal 5a into the inserting portion of the connection member 7.

When assembling the pressure detection device 1, the connection member 7 with the lead frame 8 and the pressing terminal 9 assembled therein is disposed on the base member 6, and the sensor element 2 and the bonding portion of the lead frame 8 are connected by the wire 10. Thereafter, potting of a silicone gel 12 is applied to the surface of the sensor element 2 to protect the sensor element 2 from a foreign matter. Then, in a state where the connector terminal 5a is inserted into the inserting portion of the connection member 7, the cover 11 and the base member 6 are bonded by welding so as to integrate the connector subassembly 5 to the metal case. With this configuration, the pressure detection device 1 is configured.

The sensor element 2 is a pressure detection element having a one-chip configuration in which a distortion detection element and a processing circuit are integrally formed on a silicon substrate. Therefore, there is no need to provide a circuit substrate for laying out the processing circuit. An output signal generated by the sensor element 2 to the pressure received by the diaphragm 3a is transmitted to the ECU by the harness through the wire 10, the lead frame 8, and the connector terminal 5a.

Figure 2:
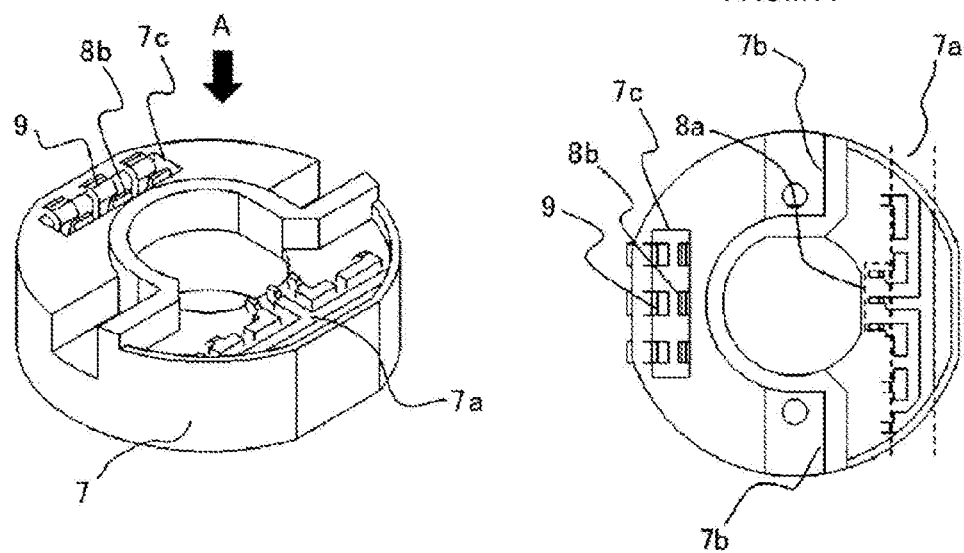
FIG. 2 is a view illustrating an outline of a connection member.

Next, the detailed shapes of the connection member 7, the lead frame 8, and the pressing terminal 9 will be described with reference to FIG. 2. FIG. 2 is a diagram illustrating the outline of the connection member 7 where the lead frame 8 and the pressing terminal 9 are assembled. In FIG. 2, the left drawing is a projected view of the connection member 7, and the right drawing is a top view.

As illustrated in FIG. 2, an inserting portion 7c is formed in the connection member 7. In the inserting portion 7c, a connector contact portion 8b and the pressing terminal 9 are disposed on one end side of the lead frame 8. Further, on the other end side of the lead frame 8, a bonding portion 8a is provided to be wire-bonded with the sensor element 2. The pressing terminal 9 has an elastic property. Therefore, when the connector terminal 5a is inserted into the inserting portion 7c, the pressing terminal 9 is deformed and presses the connector terminal 5a in the direction of the connector contact portion 8b. With this configuration, the connector terminal 5a comes into secure contact with the connector contact portion 8b, and the electrical connection between the connector terminal 5a and the lead frame 8 can be secured.

In addition, an insertion guide 7b is provided in the connection member 7 for positioning the connector terminal 5a when it is inserted into the inserting portion 7c. The position and the shape of the insertion guide 7b are formed in correspondence with the position and the shape of a projection, not illustrated, provided in the connector subassembly 5. If there is provided no insertion guide 7b, the position and the direction of the connector terminal 5a may be deviated when the connector terminal 5a is inserted into the inserting portion 7c. There is a concern that the connector terminal 5a does not correctly abut on the connector contact portion 8b. Then, with the insertion guide 7b provided in the connection member 7 in this embodiment, the insertion guide 7b is fitted to the projection of the connector subassembly 5 when assembling the connector subassembly 5, so that the connector terminal 5a is positioned. As the connector terminal 5a thus positioned is inserted into the inserting portion 7c, the connector terminal 5a can correctly abut on the connector contact portion 8b.

Further, in the connection member 7, a mounting portion 7a is provided to mount an electronic component such as a chip capacitor. The connector terminal 5a is molded by being pressed in a shape not to cause interference with the electronic component mounted in the mounting portion 7a when being inserted into the inserting portion 7c so as not to cause a problem in mounting the electronic component onto the mounting portion 7a. With this configuration, it is possible to remove the circuit substrate from the pressure detection device 1. Potting of the silicone gel 12 is applied to the mounting portion 7a similarly to the sensor element 2 after a necessary electronic component is mounted, and the surface is protected (see FIG. 1).

Next, the shape of a capacitor using a parasitic capacitance which is a feature of this embodiment will be described hereinbelow using FIGS. 3 and 4.

Figure 3:
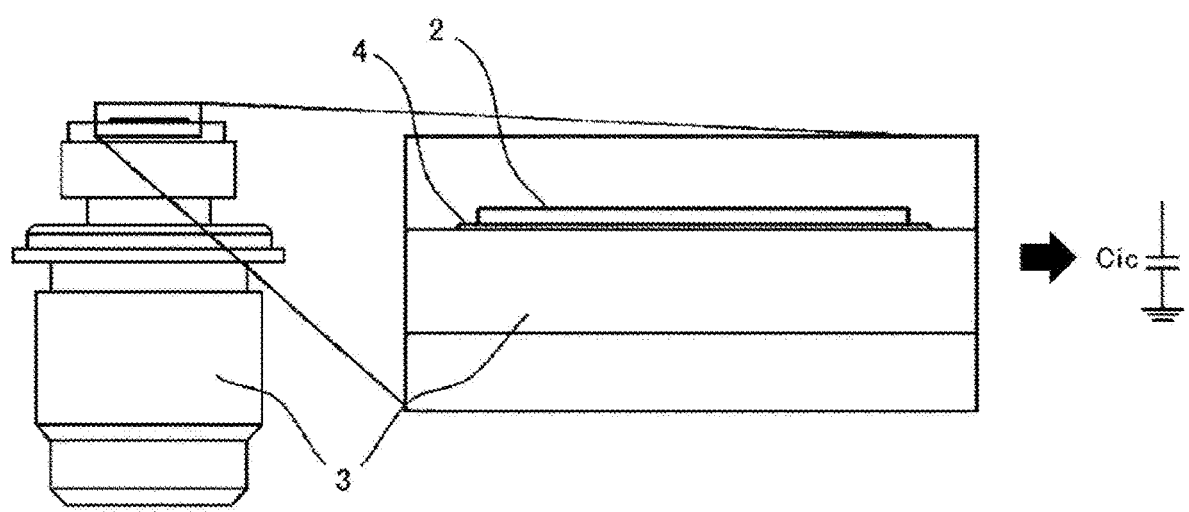
FIG. 3 is a diagram for describing the formation of a capacitor using a parasitic capacitance.

FIG. 3 is a partial enlarged view of the pressure port 3 where the sensor element 2 is mounted. As illustrated in FIG. 3, the sensor element 2 is bonded on the pressure port 3 through an adhesive 4. Further, as described above, the sensor element 2 is configured by one chip where the distortion detection element and the processing circuit are integrally formed. The adhesive 4 is an insulator such as an inorganic adhesive for example, and is coated extremely thin compared to the area of the sensor element 2. Therefore, on the circuit containing the sensor element 2, the bonding portion between the sensor element 2 and the pressure port 3 with the adhesive 4 therebetween serves as a parasitic capacitance Cic having a relatively large capacitance.

Figure 4:
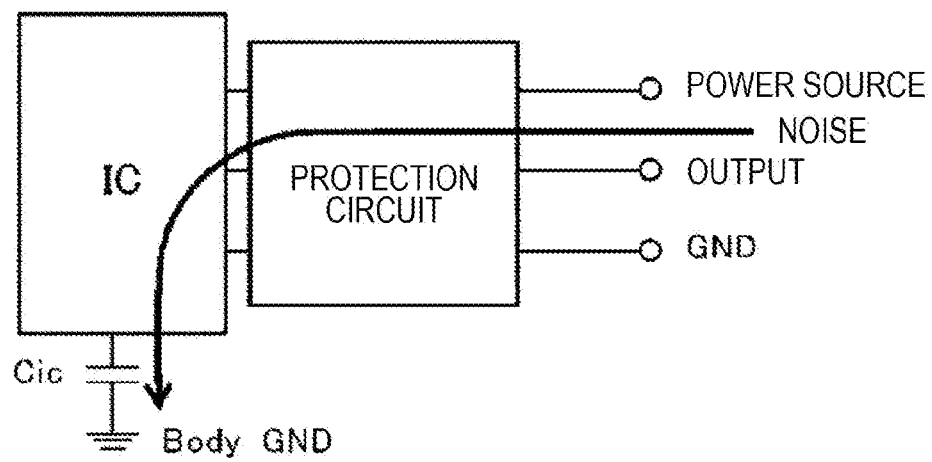
FIG. 4 is a diagram for describing an operation in a case where a parasitic capacitance Cic on a circuit and Ct of the invention are added.
Figure 4:
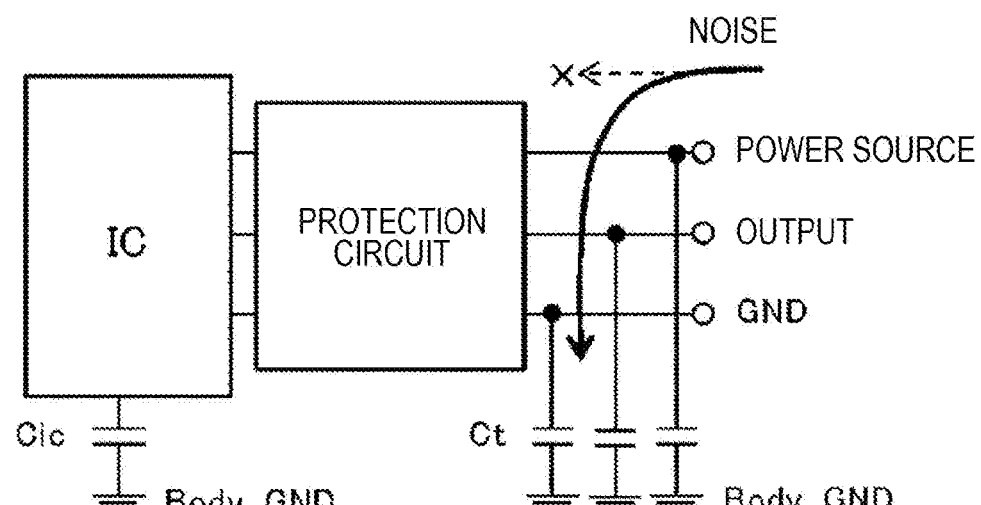

FIG. 4 is a diagram for describing an operation of the parasitic capacitance Cic on the circuit. FIG. 4(a) is a schematic diagram illustrating the circuit in a case where no noise suppression is considered. FIG. 4(b) is a schematic diagram of the circuit in a case where a capacitance Ct is provided for the noise suppression. The IC and the protection circuit illustrated in these circuit diagrams illustrate circuits configured by the sensor element 2 and the electronic components mounted in the mounting portion 7a of the connection member 7.

In the case of FIG. 4(a) where the noise suppression is not implemented, when noises are input from the wiring connected to the IC through the protection circuit, the noises flow into the metal case at a body GND potential through the parasitic capacitance Cic provided between the IC and the metal case. At that time, since the noises pass through the IC, that is, the processing circuit of the sensor element 2, there is a concern that the processing circuit causes a malfunction and the output of the sensor element 2 is abnormal.

On the other hand, in the case of FIG. 4(b) where the noise suppression is implemented, due to the capacitance Ct provided between the wiring and the metal case as a noise path, the input noises flow into the metal case at the body GND potential through the capacitance Ct, without passing through the IC. Therefore, a malfunction of the processing circuit caused by noises can be avoided, and the output abnormality of the sensor element 2 can be prevented.

In general, if parasitic components such as inductance and low resistance are ignored from the capacitor, the impedance becomes smaller as the electrostatic capacitance is increased at the same frequency and, accordingly, the AC current more easily flows. In other words, when the electrostatic capacitance of the capacitor is set to C [F], the impedance Z [Q] of the capacitor is expressed as the following Expression (1).

$$Z = 1/(\omega C) \tag{1}$$

In the above Expression (1), ω [rad/s] represents an angular frequency of the AC current flowing in the capacitor, and the following Expression (2) is obtained using the frequency f [Hz] of the AC current.

$$\omega = 2 \times \pi \times f \tag{2}$$

As described above, in the AC current of the same frequency, the impedance Z becomes smaller as the electrostatic capacitance C is increased and, accordingly, the AC current more easily flows. Therefore, the noises flowing into the processing circuit can be suppressed by setting the value of the capacitance Ct larger than the parasitic capacitance Cic, and the noise resistance of the sensor element 2 can be improved.

In this embodiment, with the connection member 7 being an insulator provided between the lead frame 8 and the metal case as, the parasitic capacitance is caused between the lead frame 8 and the metal case. Using the parasitic capacitance as the capacitance Ct described above, the noise resistance of the sensor element 2 is improved by. In the following, such a configuration will be described with reference to FIG. 5.

Figure 5:
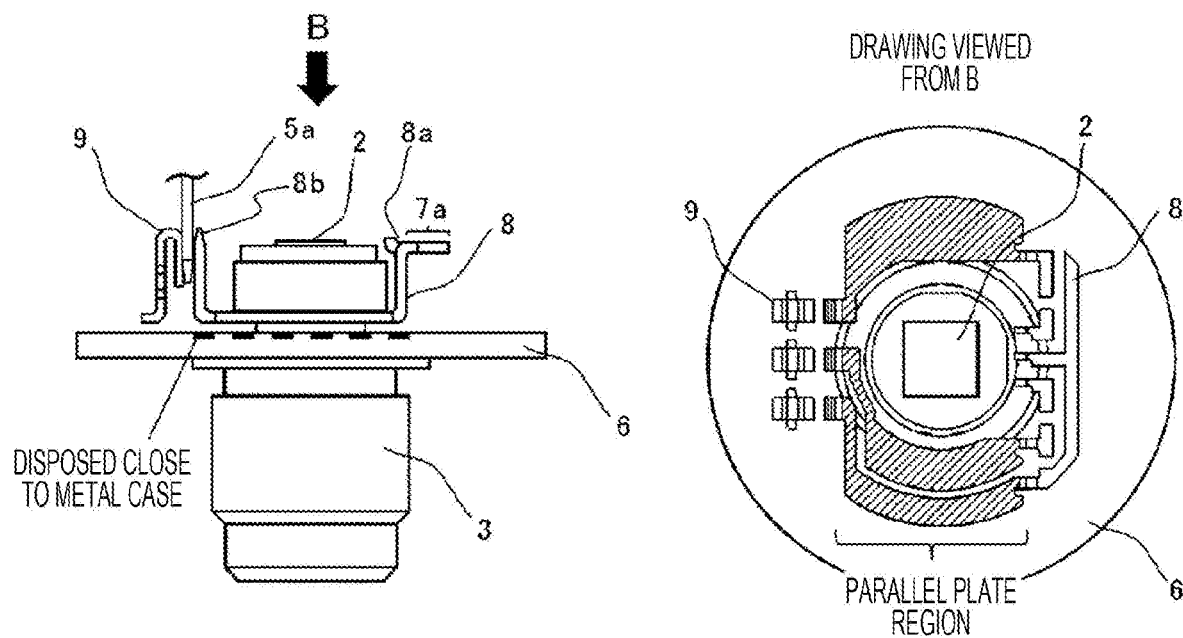
FIG. 5 is a diagram illustrating a positional relation of a lead frame and a metal case.

FIG. 5 is a diagram illustrating a positional relation of a lead frame 8 and a metal case. In FIG. 5, in order to help with understanding on the positional relation between the lead frame 8 and the metal case, the outline of the pressure detection device 1 is illustrated while removing the tip end of the connector terminal 5a from the connector subassembly 5 and the connection member 7. In FIG. 5, the left drawing is a front view, and the right drawing is a top view.

As illustrated in the right side of FIG. 5 with a hatched portion, in the portion between the bonding portion 8a and the connector contact portion 8b in the lead frame 8, there is formed a parallel plate region which is a plate region formed in parallel with the base member 6. The parallel plate region is formed to have a width as wide as possible, and disposed as closer as possible to the base member 6. With this configuration, a parallel plate capacitor is formed by the lead frame 8 and the metal case, and the parasitic capacitance Ct serving as the noise path is actively generated.

While not illustrated in FIG. 5, in a portion where the parallel plate capacitor is formed, the connection member 7, which is configured by an insulator such as resin, is disposed between the lead frame 8 and the metal case (the base member 6). Therefore, the parasitic capacitance Ct can be increased as much as a dielectric constant of the insulator, as compared to the case of air. Further, the connection member 7 and the base member 6 may be bonded with an insulating adhesive, and the adhesive may so as to use the connection member 7 and the base member 6, including the adhesive, as a dielectric material of the parallel plate capacitor. With this configuration, the electrostatic capacitance of the parasitic capacitance Ct becomes larger than the parasitic capacitance Cic as described above, and the noise resistance of the sensor element 2 can be secured.

In the related art, a chip capacitor is used as a capacitor for the noise path. The chip capacitor is boned using a hetero metal for the connection to the wiring and the metal case by soldering, and there may be corrosion. On the other hand, in the pressure detection device 1 of this embodiment, the surface on the lower side in the parallel plate region of the lead frame 8, that is, the surface on the side of the base member 6, and the surface on the upper side of the base member 6 in the metal case are disposed to face each other with a predetermined gap therebetween while interposing the resin and the adhesive of the connection member 7 being an insulator. With this configuration, the parallel plate capacitor is formed between the lead frame 8 and the metal case, and the parasitic capacitance Ct caused by the parallel plate capacitor is used as the capacitor for the noise path. Therefore, it is possible to improve the noise resistance of the pressure detection device 1 while avoiding the hetero metal bonding. Further, since the chip capacitor is not used, it is possible to avoid the number of components from increasing.

Further, in a case where the connection member 7 is configured by a mold resin, there is a minimum thickness for the member to be disposed between lead frame 8 and the metal case due to a restriction at the time of molding. Therefore, a necessary electrostatic capacitance may be not obtained in the parasitic capacitance Ct. Then, the resin of the connection member may not be disposed between the lead frame 8 and the metal case (the base member 6) using the connection member having a shape different from the connection member 7, such that the adhesive to bond the connection member and the base member 6 can be used as a dielectric material of the parallel plate capacitor.

Figure 6:
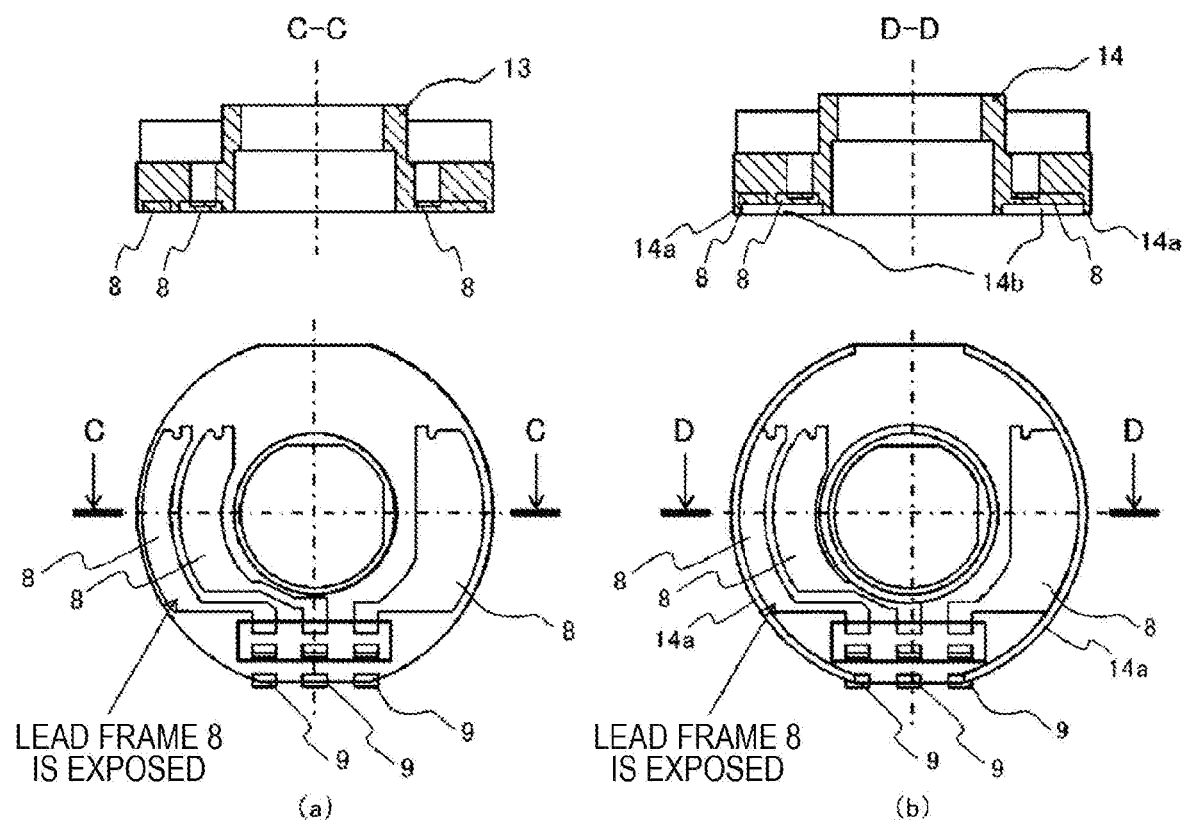
FIG. 6 is a diagram illustrating a shape example of the connection member in a case where a parallel plate capacitor is formed using an adhesive.

FIG. 6 is a diagram illustrating a shape example of the connection member in a case where a parallel plate capacitor is formed using an adhesive. In a connection member 13 illustrated in FIG. 6 (a), the lead frame 8 is attached to the connection member 13 in a state where the surface on the lower side in the parallel plate region of the lead frame 8, that is, the surface on the side of the base member 6, is exposed from the connection member 13. When the connection member 13 attached with the lead frame 8 is placed on the base member 6, part of the lead frame 8, that is, the surface facing the base member 6 of the lead frame 8 is exposed from the bottom surface, that is, the surface of the connection member 13 facing the metal case (the base member 6) of the connection member 13. In this state, if the connection member 13 is an insulating adhesive and attached to the base member 6, the adhesive serves as a dielectric material of the parallel plate capacitor, and the parasitic capacitance Ct is formed between the lead frame 8 and the metal case. At this time, a desired electrostatic capacitance can be obtained in the parasitic capacitance Ct by controlling the amount of adhesive to adjust the thickness of the adhesive layer.

In addition, a connection member 14 illustrated in FIG. 6 (b) may be used. In the bottom surface of the connection member 14, a wall portion 14a formed along the outer edge and a filling portion 14b surrounded by the wall portion 14a are provided. The filling portion 14b is recessed from the wall portion 14a with respect to the bottom surface. Even in the connection member 14, similarly to the connection member 13 of FIG. 6 (a), the lead frame 8 is attached to the connection member 14 in a state where the surface on the lower side in the parallel plate region of the lead frame 8, that is, the surface on the side of the base member 6 is exposed from the connection member 14. When the connection member 14 with the lead frame 8 attached is placed on the base member 6, the bottom surface of the wall portion 14a comes into contact with the metal case (the base member 6). At this time, the positioning when the connection member 14 is attached to the metal case may be performed by the wall portion 14a. Further, a groove or a step corresponding to the projecting shape of the wall portion 14a is formed on a side near the metal case, and the wall portion 14a is fitted to the groove or the step, so that the positioning of the connection member 14 may be performed. In addition, part of the lead frame 8, that is, the surface facing the base member 6 of the lead frame 8 is exposed from the surface of the filling portion 14b facing the metal case (the base member 6). In this state, when an insulating adhesive is filled in the filling portion 14b and the connection member 14 is attached to the base member 6, similarly to the case of the connection member 13, the adhesive serves as the dielectric material of the parallel plate capacitor and the parasitic capacitance Ct is formed between the lead frame 8 and the metal case. The thickness of the adhesive layer at this time becomes height of the wall portion 14a, so that it is possible to suppress the variation in distance between the lead frame 8 and the metal case. Therefore, a desired electrostatic capacitance can be obtained in the parasitic capacitance Ct with accuracy by adjusting the height of the wall portion 14a. Further, some of the lead frame 8 may be not exposed in the filling portion 14b.

Further, when the connection member 14 is attached to the metal case, the metal case may be disposed to protrude toward the lead frame 8 in the filling portion 14b with respect to the bottom surface of the wall portion 14a. For example, when the projecting portion of the flat table-like top portion is formed in the metal case and the connection member 14 is attached, the projecting portion may be inserted into the concave portion of the filling portion 14b so as to realize the positioning described above. Alternatively, as described above, a groove corresponding to the projecting shape of the wall portion 14a may be provided in the metal case and the wall portion 14a is fitted to the groove, so that the above positioning can also be realized. With this configuration, the metal case and the lead frame 8 can be disposed in a distance smaller than a minimum resin thickness due to a restriction at the time of molding as described above. Therefore, the parasitic capacitance Ct can be increased.

Next, the distance between the lead frame 8 and the metal case will be described. As described above, in order to increase the electrostatic capacitance of the parasitic capacitance Ct, the parallel plate region of the lead frame 8 is provided near the metal case as close as possible. However, even in a case where a surge voltage of about several hundreds [V] is input, there is a need to secure a distance to some degrees so that the insulation between the lead frame 8 and the metal case is secured so as not to be conducted.

It is generally known that a dielectric breakdown of the air occurs when a potential gradient E [V/m] is equal to or more than 3 [MV/m]. In a case where there is a defect such as a void in the insulator, the surrounding resin is carbonized when the dielectric breakdown occurs which leads to a defect such as conduction between the lead frame 8 and the metal case. Herein, the value of the surge voltage generally assumed in a surge test is about 300 [V]. Therefore, a minimum distance between the lead frame 8 and the metal case is calculated from these values to be 0.1 [mm].

In addition, as a result of the EMC test using the pressure detection device 1 of this embodiment, it is confirmed that an expected noise resistance is not exhibited if the parasitic capacitance Ct is less than 9 [pF]. Herein, the capacitance C [F] of the parallel plate capacitor is obtained by the following Expression (3) when the area of the plate is set to A [m$^2$], a plate distance is set to d [m], and a dielectric constant is set to E [F/m].

$$C=(\varepsilon A)/d \qquad (3)$$

In the above Expression (3), the values corresponding to the pressure detection device 1 are substituted to A and ε, respectively, and the plate distance d at C=9 [pF] is calculated, d=0.6 [mm] is obtained. Therefore, a maximum distance between the lead frame 8 and the metal case is obtained to be 0.6 [mm].

As described above, the distance between the lead frame 8 and the metal case in the pressure detection device 1 is desirably set in a range of 0.1 [mm] to 0.6 [mm]. However, the maximum distance is not limited to 0.6 [mm] because the maximum distance varies according to the area of the parallel plate region of the lead frame 8, the connection member interposed between the lead frame 8 and the metal case, or the dielectric constant of the adhesive.

In addition, in order to improve the noise resistance of the pressure detection device 1, it is effective to decrease the electrostatic capacitance of the parasitic capacitance Cic, instead of increasing the electrostatic capacitance of the parasitic capacitance Ct. Specifically, for example, the adhesive 4 to be used to bond the sensor element 2 to the pressure port 3 is made thicker, so that the electrostatic capacitance of the parasitic capacitance Cic can be decreased. In other words, it can be seen from the above Expression (3) that the capacitance C of the parallel plate capacitor is decreased as the plate distance d is increased. Therefore, the electrostatic capacitance of the parasitic capacitance Ct can be decreased to improve the noise resistance of the pressure detection device 1 by thickening the adhesive 4 within a range not affecting the distortion detection performance of the sensor element 2 and by putting a distance between the sensor element 2 and the pressure port 3.

Further, in the pressure detection device 1, a position where the parasitic capacitance Ct is generated is desirably set on the input side of the circuit illustrated in FIG. 4 as near as possible. In order words, the position is set on a side near the connector terminal 5a from the mounting portion 7a where the electronic component such as the chip capacitor is mounted in the connection member 7. In this case, the connection order from the viewpoint of the sensor element 2 becomes an order of the wire 10, the bonding portion 8a of the lead frame 8, the electronic component, and the parasitic capacitance Ct. In other words, in the lead frame 8, the electronic component mounted in the mounting portion 7a is connected on an electric path between the bonding portion 8a and the parallel plate region. With this configuration, the input noises can effectively flow from the parasitic capacitance Ct to the metal case, so that the noise resistance is improved still more.

Figure 7:
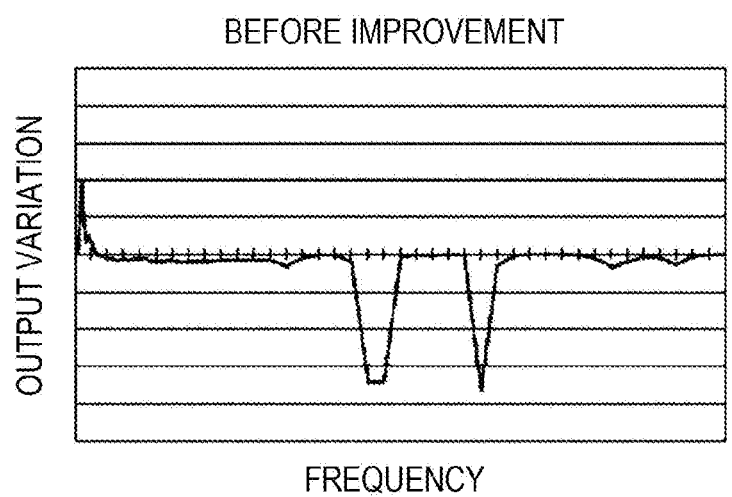
FIG. 7 is a diagram illustrating an example of an EMC test result with respect to the pressure detection device.
Figure 7:
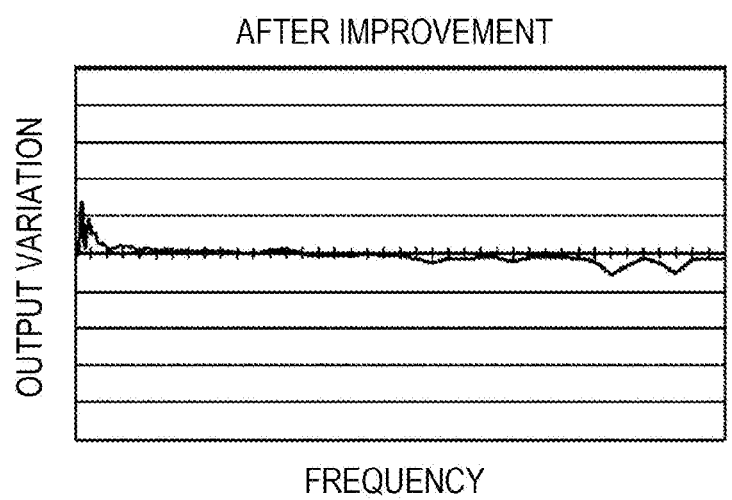

FIG. 7 is a diagram illustrating an example of an EMC test result with respect to the pressure detection device 1. FIG. 7(a) illustrates an example of the EMC test result in a case where the structure for the noise suppression described so far is not provided. FIG. 7(b) illustrates an example of the EMC test result in a case where the structure of the noise suppression is provided. Comparing FIG. 7(a) and FIG. 7(b), it can be seen that a good noise resistance is obtained over a wide frequency range according to the structure of the noise suppression of this embodiment.

Next, another role of the pressing terminal 9 which is provided separate from the lead frame 8 forming the parasitic capacitance Ct will be described. The pressing terminal 9 forms a spring to bring the connector terminal 5a to abut on the connector contact portion 8b in the inserting portion 7c as described above. In addition, a plurality of pressing terminals 9 are integrally formed at the time of molding of the connection member 7, and separated into each pressing terminal 9 through a cutting process after molding. The pressing terminal 9 is disposed close to the metal case similarly to the lead frame 8. Therefore, the exposed portion close the metal case is used to make the pressing terminal 9 serve as a discharge gap when an electrostatic force is applied.

According to the embodiment of the invention described above, the following operational advantages are achieved.

(1) The pressure detection device 1 includes: a deformation portion, that is, the metal case having the diaphragm 3a, which is deformed due to a pressure received from the pressure medium; the sensor element 2 which detects a pressure by detecting the deformation of the deformation portion; the lead frame 8 which is electrically connected to the sensor element 2; and a structure, that is, the connection member 7 to hold the lead frame 8. A first surface of the lead frame 8, that is, the surface on a side near the metal case in the parallel plate region, and a second surface of the metal case, that is, the upper surface of the base member 6 interpose at least one of the resin of the connection member 7 being an insulator and the insulating adhesive and are disposed to face each other with a predetermined gap therebetween. With such a configuration, the parasitic capacitance is generated between the lead frame 8 and the metal case, and the noise resistance of the pressure detection device 1 being a pressure sensor can be improved while avoiding the hetero metal bonding.

(2) The electrostatic capacitance between the first surface and the second surface, that is, the electrostatic capacitance of the parasitic capacitance Ct is desirably larger than the electrostatic capacitance between the sensor element 2 and the metal case, that is, the electrostatic capacitance of the parasitic capacitance Cic. With such a configuration, the noises flowing to the sensor element 2 are reduced, and a malfunction of the sensor element 2 caused by the noises can be prevented.

(3) The inserting portion 7c is formed in the connection member 7 to insert the connector terminal 5a which is electrically connected through the sensor element 2 and the lead frame 8. The pressing terminal 9 being a pressing member is disposed in the inserting portion 7c so as to press the lead frame 8 and the connector terminal 5a to abut on the lead frame 8. With such a configuration, the connector terminal 5a comes into secure contact with the lead frame 8, and the electrical connection between the connector terminal 5a and the lead frame 8 can be secured.

(4) A guide portion, that is, the insertion guide 7b is formed in the connection member 7 for positioning the connector terminal 5a when the connector terminal 5a is inserted into the inserting portion 7c. With such a configuration, the deviation in position and direction of the connector terminal 5a can be prevented, and the connector terminal 5a can come into secure contact with the lead frame 8 by the pressing terminal 9.

(5) The connection member 7 is formed of resin, and part of the connection member 7 is formed as an insulator which is disposed between the first surface and the second surface. With such a configuration, a desired electrostatic capacitance can be obtained using part of the connection member 7 as a dielectric material.

(6) The first surface may be configured to be exposed from the surface of the structure facing the metal case, that is, the bottom surface of the connection member 13 and the connection member 14. With such a configuration, the first surface can be approached to the metal case regardless of a restriction at the time of molding, and a desired electrostatic capacitance can be obtained.

(7) The connection member 7, 13, or 14 is bonded to the metal case by the adhesive. The adhesive may be disposed between the first surface and the second surface as an insulator. With such a configuration, a desired electrostatic capacitance can be obtained by controlling the amount of adhesive to adjust the thickness of the adhesive layer.

(8) The connection member 14 includes a contact surface, that is, the bottom surface of the wall portion 14a, which abuts on the metal case, and the filling portion 14b which is recessed from the contact surface and filled with the adhesive. With the connection member 14, a desired electrostatic capacitance can be accurately obtained by adjusting the height of the wall portion 14a.

(9) The lead frame 8 includes a connection portion, that is, the bonding portion 8a, which is connected to the sensor element 2 by wire bonding, and an electronic component is connected on an electric path between the connection portion and the first surface. With such a configuration, the noise resistance is improved still more.

(10) A predetermined gap between the first surface and the second surface is desirably set to be equal to or more than 0.1 mm. With such a configuration, it is possible to prevent the conduction between the lead frame 8 and the metal case due to the dielectric breakdown.

(11) The metal case includes the pressure port 3 which guides the pressure medium to the deformation portion, and the base member 6 which is boned to the connection member 7. With such a configuration, it is possible to configure the pressure detection device 1 which has a high noise resistance.

Further, in the above-described embodiment, the sensor element 2 has been described as a one-chip type element in which the distortion detection element and the processing circuit are integrated. However, the present invention is similarly applicable even to a sensor element other than the one-chip type in which a distortion gauge and the processing circuit are formed on separate substrates. In this case, since the distortion gauge is disposed in an insulating state at a place closest to the metal case, the parasitic capacitance of a large electrostatic capacitance is formed between the distortion gauge and the metal case. Therefore, since noises pass through the processing circuit when flowing into the parasitic capacitance, there is a concern that a malfunction occurs in the sensor element. Accordingly, even in this case, the countermeasure similar to the embodiment is effective.

In addition, the pressure detection device 1 in the embodiment has been described to be mounted in a vehicle to detect the pressure of the pressure medium such as the working fluid and the liquid fuel. However, the invention is similarly applicable to a pressure detection device used for other purposes. As far as the sensor element is disposed close to the metal case in an insulated state and the metal case is at the GND potential, the effective improvement of the noise resistance according to the invention can be obtained in various types of pressure detection devices. For example, a large force is applied to a sensor which detects a load as a distortion. Therefore, the resin is not able to be used to receive the pressure. In addition, the pedestal of the sensor element is necessarily to be configured strong. Therefore, the case of such a sensor is inevitably configured of metal so as to be a similar configuration to the pressure detection device 1 described in the embodiment, so that the noise resistance can be improved by applying the invention similarly.

Further, as described above, the sensor element used in the sensor may be the one-chip type sensor element in which the distortion detection element and the processing circuit are integrated. Alternatively, the distortion detection element and the processing circuit may be formed on separate substrates. In either case, the operational advantage similar to those in the embodiment can be obtained.

The pressure detection device to which the invention is applied is not limited to the donut shape described in the embodiment, but may be formed in different shapes. If the technical elements described so far may be combined, any shape may be applied.

As described above, with the application of the invention in the pressure detection device, the capacitor for a noise path may be formed without causing the hetero metal bonding. Since the chip capacitor is not used, the connection reliability can be improved, the cost can be reduced, and the space saving can be expected.

The above-described embodiment and various modifications are described as merely exemplary. The invention is not limited to the contents as long as the features of the invention are not damaged. In addition, various embodiments and modifications have been described, but the invention is not limited to these contents. Other embodiments considered within a scope of technical ideas of the invention may also be included in the scope of the invention.

REFERENCE SIGNS LIST 1 pressure detection device
2 sensor element
3 pressure port
3a diaphragm
3b pedestal surface
4 adhesive
5 connector subassembly
5a connector terminal
6 base member
7 connection member
7a mounting portion
7b insertion guide
7c inserting portion
8 lead frame
8a bonding portion
8b connector contact portion
9 pressing terminal
10 wire
11 cover
12 silicone gel

The invention claimed is:

1. A pressure detection device, comprising:
a metal case which includes a deformation portion, the deformation portion being deformed by a pressure received from a pressure medium;
a detection element which detects the pressure by detecting deformation of the deformation portion;
a lead frame which is electrically connected to the detection element; and
a structure which holds the lead frame,
wherein a first surface of the lead frame and a second surface of the metal case are disposed facing each other with a predetermined gap while interposing an insulator therebetween.

2. The pressure detection device according to claim 1,
wherein an electrostatic capacitance between the first surface and the second surface is larger than an electrostatic capacitance between the detection element and the metal case.

3. The pressure detection device according to claim 1,
wherein, in the structure, an inserting portion is formed to insert a connector terminal electrically connected to the detection element through the lead frame, and
wherein, in the inserting portion, the lead frame and a pressing member which presses the connector terminal to abut on the lead frame are disposed.

4. The pressure detection device according to claim 3,
wherein, in the structure, a guide portion is formed to position the connector terminal when the connector terminal is inserted into the inserting portion.

5. The pressure detection device according to claim 1,
wherein the structure is formed of resin, and
wherein part of the structure is disposed between the first surface and the second surface as the insulator.

6. The pressure detection device according to claim 1,
wherein the first surface is exposed from a surface of the structure facing the metal case.

7. The pressure detection device according to claim 5,
wherein the structure is bonded to the metal case by an adhesive, and
wherein the adhesive is disposed between the first surface and the second surface as the insulator.

8. The pressure detection device according to claim 7,
wherein the structure includes a contact surface abutting on the metal case and a filling portion which is recessed from the contact surface and filled with the adhesive.

9. The pressure detection device according to claim 1,
wherein the lead frame includes a connection portion which is connected to the detection element by wire bonding, and
wherein an electronic component is connected on an electric path between the connection portion and the first surface.

10. The pressure detection device according to claim 1,
wherein the predetermined gap is equal to or more than 0.1 mm.

11. The pressure detection device according to claim 1,
wherein the metal case includes a pressure port which guides the pressure medium to the deformation portion, and a base member which is bonded to the structure.

* * * * *